United States Patent [19]
Tuttle et al.

[11] Patent Number: 5,988,510
[45] Date of Patent: *Nov. 23, 1999

[54] TAMPER RESISTANT SMART CARD AND METHOD OF PROTECTING DATA IN A SMART CARD

[75] Inventors: John R. Tuttle; Clifton W. Wood, Jr., both of Boise, Id.; Arthur Barney McCabe, Albuquerque, N.Mex.

[73] Assignee: Micron Communications, Inc., Boise, Id.

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,037

[22] Filed: Feb. 13, 1997

[51] Int. Cl.⁶ .............................. G06K 19/06; G06K 5/00
[52] U.S. Cl. ............................................. 235/492; 235/380
[58] Field of Search ..................................... 235/492, 380

[56] References Cited

U.S. PATENT DOCUMENTS

| | | | |
|---|---|---|---|
| 3,702,464 | 11/1972 | Castrucci | 340/173 |
| 3,706,094 | 12/1972 | Cole et al. | 342/44 |
| 3,750,167 | 7/1973 | Gehman et al. | 342/44 |
| 3,780,368 | 12/1973 | Northeved et al. | 342/44 |
| 3,832,530 | 8/1974 | Reitboeck et al. | 342/44 |
| 3,849,633 | 11/1974 | Reitboeck et al. | 235/487 |
| 3,906,460 | 9/1975 | Halpern | 340/172.5 |
| 4,049,969 | 9/1977 | Salonimer et al. | 356/5 |

(List continued on next page.)

FOREIGN PATENT DOCUMENTS

| | | |
|---|---|---|
| 128 672 | 5/1984 | European Pat. Off. . |
| 414 316 | 8/1990 | European Pat. Off. . |
| 4120265 | 1/1992 | Germany . |
| 90-5445 | 6/1990 | Rep. of Korea . |
| 1567784 | 5/1980 | United Kingdom . |

OTHER PUBLICATIONS

U.S. application No. 08/422,007, filed Apr. 11, 1995.
U.S. application No. 08/071463, filed Jun. 2, 1993.
U.S. application No. 08/515,128, filed Aug. 15, 1995.
U.S. application No. 08/410,889, filed Mar. 27, 1995.
U.S. application No. 08/530,747, filed Sep. 19, 1995.
U.S. application No. 08/588,559, filed Jan. 18, 1996.
U.S. application No. 08/205,590, filed Mar. 2, 1994.
U.S. application No. 08/147,495, filed Nov. 5, 1993.

(List continued on next page.)

Primary Examiner—Michael G Lee
Assistant Examiner—Daniel Sherr
Attorney, Agent, or Firm—Wells, St. John, Roberts, Gregory & Matkin, P.S.

[57] ABSTRACT

A method of protecting data in a smart card from unauthorized access, the method comprising providing a housing defined by first and second housing portions; employing a volatile memory in the smart card for storing the data, and supporting the volatile memory from the first housing portion; providing a power supply in the housing, the power supply maintaining the data in the volatile memory while the power supply is connected to the volatile memory; and connecting the power supply to the volatile memory using a conductor supported by and movable with the second housing portion. A smart card comprising a housing including two opposing major portions that are connected together; an integrated circuit supported in the housing, the integrated circuit including a microprocessor and a random access memory, the random access memory being used to store data; a battery supported in the housing and having first and second terminals, the first terminal being coupled to the integrated circuit; and a conductor coupling the second terminal of the battery to the integrated circuit to complete a circuit, the conductor being supported by the housing such that separation of one of the portions of the housing from the other portion opens the circuit and breaks connection of the battery to the microprocessor so that data held in the random access memory is erased.

37 Claims, 5 Drawing Sheets

U.S. PATENT DOCUMENTS

| | | | |
|---|---|---|---|
| 4,075,632 | 2/1978 | Baldwin et al. | 343/6.8 |
| 4,226,361 | 10/1980 | Taylor | 235/380 |
| 4,331,957 | 5/1982 | Enander et al. | 342/22 |
| 4,399,441 | 8/1983 | Vaughn et al. | 342/50 |
| 4,418,411 | 11/1983 | Strietzel | 340/870.16 |
| 4,453,074 | 6/1984 | Weinstein | 235/380 |
| 4,484,355 | 11/1984 | Henke et al. | 455/76 |
| 4,499,556 | 2/1985 | Halpern | 364/900 |
| 4,649,233 | 3/1987 | Bass et al. | 380/21 |
| 4,661,691 | 4/1987 | Halpern | 235/375 |
| 4,680,724 | 7/1987 | Sugiyama et al. | 364/708 |
| 4,724,427 | 2/1988 | Carroll | 340/572 |
| 4,727,560 | 2/1988 | Van Zanten et al. | 377/60 |
| 4,746,618 | 5/1988 | Nath et al. | 437/2 |
| 4,746,830 | 5/1988 | Holland | 310/313 D |
| 4,756,717 | 7/1988 | Sturgis et al. | 427/290 |
| 4,777,563 | 10/1988 | Teraoka et al. | 361/395 |
| 4,783,646 | 11/1988 | Matsuzaki | 340/572 |
| 4,812,632 | 3/1989 | Kakinuma et al. | 235/479 |
| 4,827,110 | 5/1989 | Rossi et al. | 235/376 |
| 4,827,395 | 5/1989 | Anders et al. | 364/138 |
| 4,854,328 | 8/1989 | Pollack | 128/736 |
| 4,882,294 | 11/1989 | Christenson | 437/90 |
| 4,908,502 | 3/1990 | Jackson | 235/437 |
| 4,911,217 | 3/1990 | Dunn et al. | 152/152.1 |
| 4,918,631 | 4/1990 | Hara et al. | 364/708 |
| 4,926,182 | 5/1990 | Ohta et al | 342/44 |
| 4,942,327 | 7/1990 | Wantanabe et al. | 310/313 |
| 4,960,983 | 10/1990 | Inoue | 235/449 |
| 4,962,415 | 10/1990 | Yamamoto et al. | 357/74 |
| 5,008,776 | 4/1991 | Queyssac | 361/392 |
| 5,018,051 | 5/1991 | Yamada et al. | 361/393 |
| 5,023,573 | 6/1991 | Adam | 333/17.2 |
| 5,068,894 | 11/1991 | Hoppe | 380/23 |
| 5,095,240 | 3/1992 | Nyson et al. | 342/44 |
| 5,144,314 | 9/1992 | Malmberg et al. | 342/44 |
| 5,148,504 | 9/1992 | Levi et al. | 385/14 |
| 5,153,710 | 10/1992 | McCain | 357/75 |
| 5,166,502 | 11/1992 | Rendleman et al. | 235/492 |
| 5,212,664 | 5/1993 | Shinohara | 365/229 |
| 5,214,410 | 5/1993 | Verster | 340/572 |
| 5,233,505 | 8/1993 | Chang et al. | 361/7.85 |
| 5,274,221 | 12/1993 | Matsubara | 235/492 |
| 5,302,954 | 4/1994 | Brooks et al. | 342/44 |
| 5,313,211 | 5/1994 | Tokuda et al. | 342/50 |
| 5,319,516 | 6/1994 | Perkins | 361/220 |
| 5,326,652 | 7/1994 | Lake | 429/127 |
| 5,337,063 | 8/1994 | Takahira | 343/741 |
| 5,350,645 | 9/1994 | Lake et al. | 429/124 |
| 5,394,609 | 3/1995 | Ferguson et al. | 29/840 |
| 5,414,427 | 5/1995 | Gunnarsson | 342/51 |
| 5,416,423 | 5/1995 | De Borde | 324/677 |
| 5,432,027 | 7/1995 | Tuttle et al. | 429/127 |
| 5,434,397 | 7/1995 | Diehl et al. | 235/380 |
| 5,448,110 | 9/1995 | Tuttle et al. | 257/723 |
| 5,480,462 | 1/1996 | Tuttle | 29/623.5 |
| 5,486,431 | 1/1996 | Tuttle et al. | 429/66 |
| 5,494,495 | 2/1996 | Tuttle | 29/623.2 |
| 5,497,140 | 3/1996 | Tuttle | 342/51 |
| 5,510,074 | 4/1996 | Rose | 264/261 |
| 5,558,679 | 9/1996 | Tuttle . | |
| 5,568,441 | 10/1996 | Sanemitsu | 365/229 |
| 5,577,121 | 11/1996 | Davis et al. | 380/24 |
| 5,578,415 | 11/1996 | Hayashi et al. | 430/270.11 |
| 5,621,412 | 4/1997 | Sharpe et al. | 342/51 |
| 5,649,296 | 7/1997 | MacLellan et al. | 455/38.2 |

OTHER PUBLICATIONS

U.S. application No. 08/538,826, filed Oct. 5, 1995.
U.S. application No. 08/585,428, filed Jan. 11, 1996.
U.S. application No. 08/610,236, filed Mar. 4, 1996.
U.S. application No. 08/584,788, filed Jan. 9, 1996.
U.S. application No. 08/489,185, filed Jun. 9, 1995.
U.S. application No. 08/602,686, filed Feb. 16, 1996.
K. Casson et al., "High Temperature Packaging: Flip Chip on Flexible Laminate", Jan. 1992, Surface Mount Technology, pp. 19–20.
R.W. Johnson, "Polymer Thick Films: Technology and Materials", Jul. 1982, Circuits Manufacturing (reprint).
K. Gilleo, "Using SM Devices On Flexible Circuitry", Mar. 1986, Electri–onics, pp. 20–23.
M.G. Kanarzibis "Conductive Polymers", Dec. 3, 1990, Chemical and Engineering News—American Chemical Society, pp. 36–54.

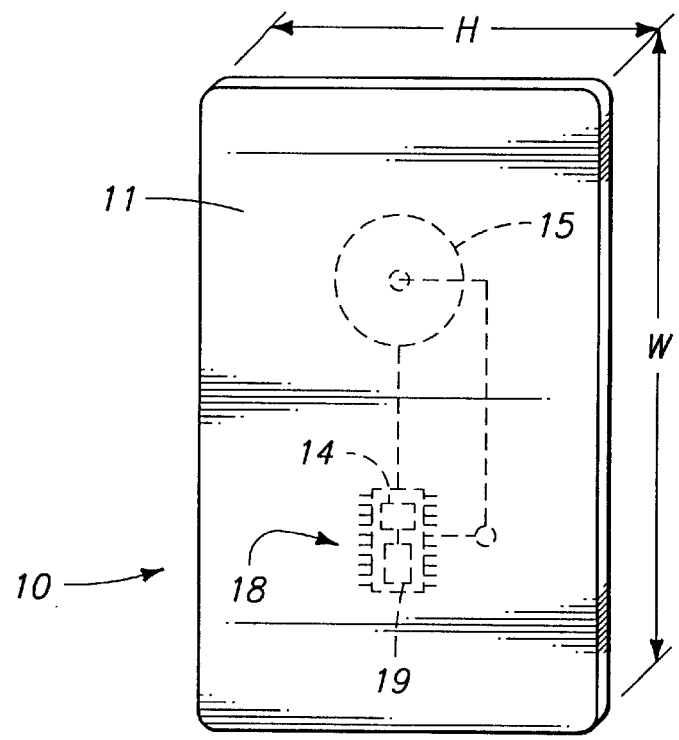
_Fig. 1_
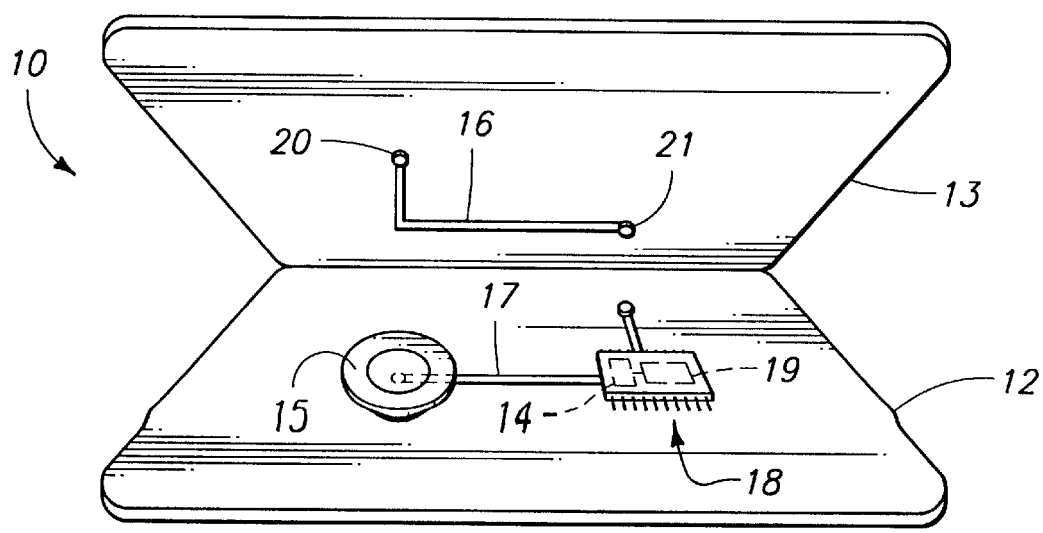
_Fig. 2_

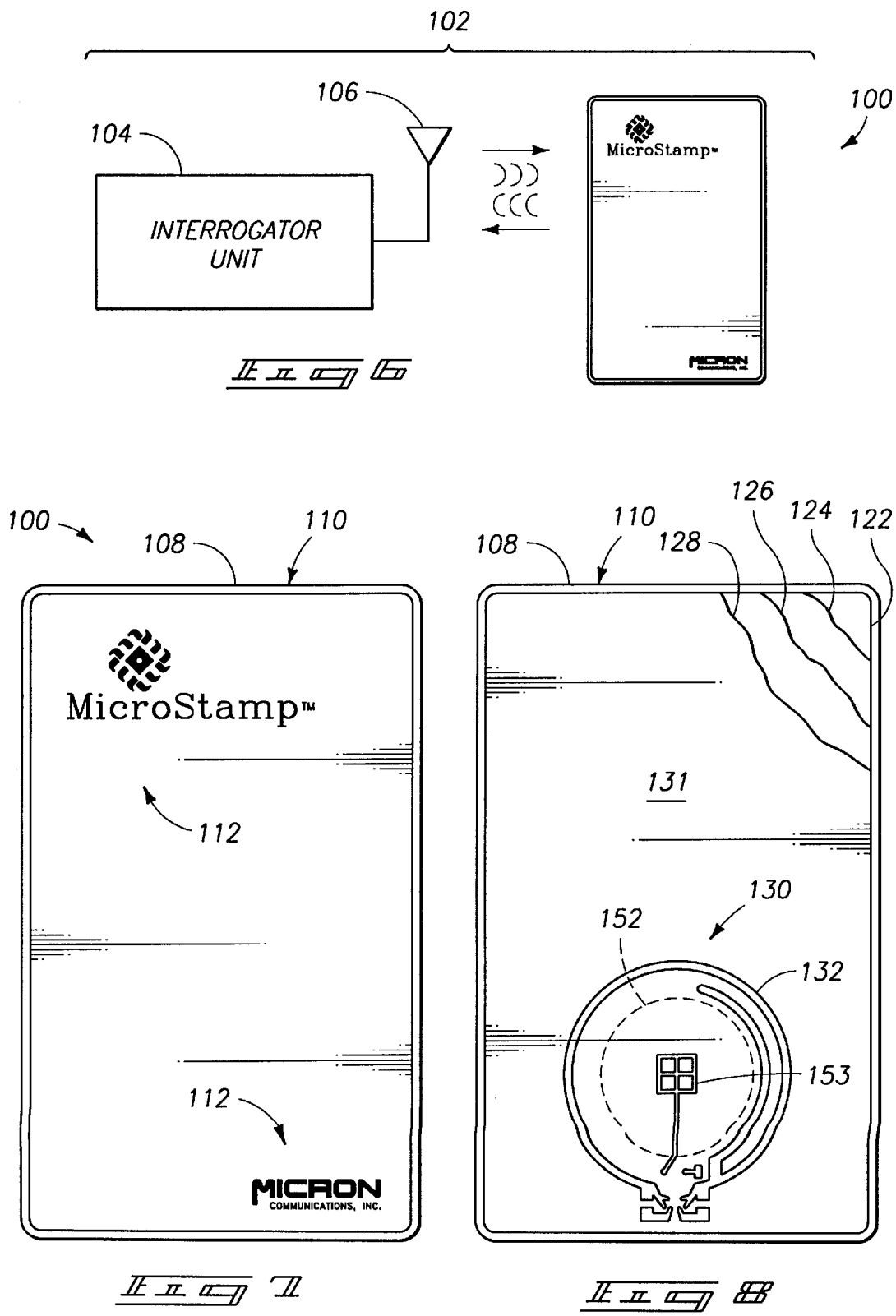

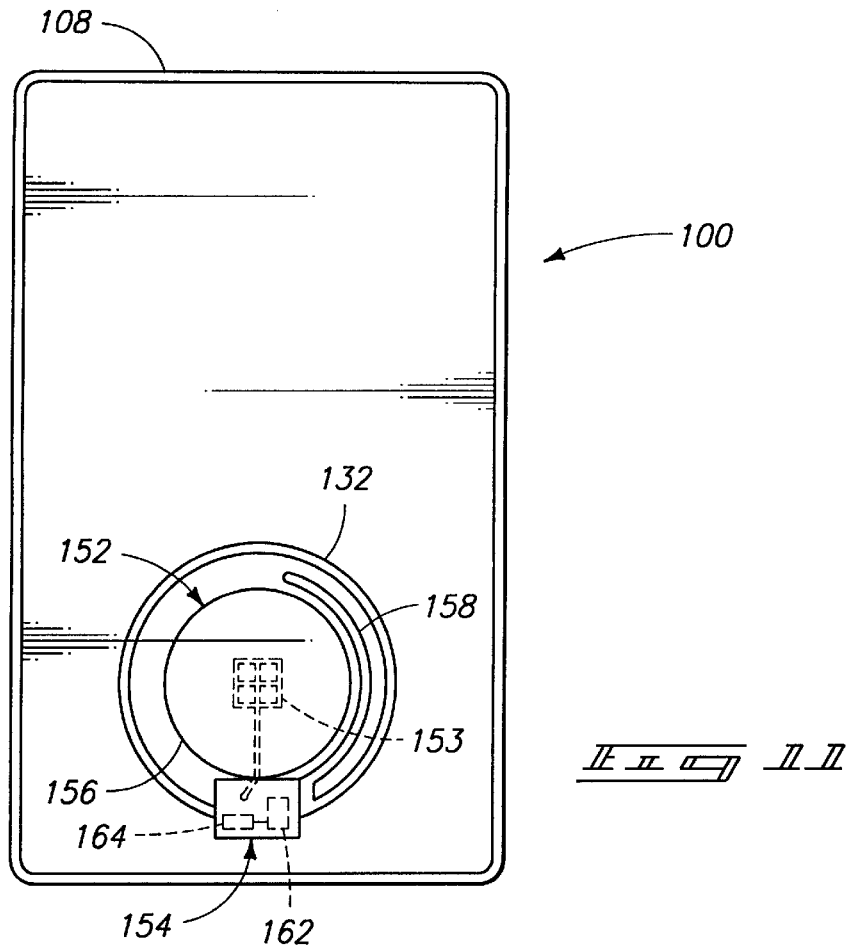
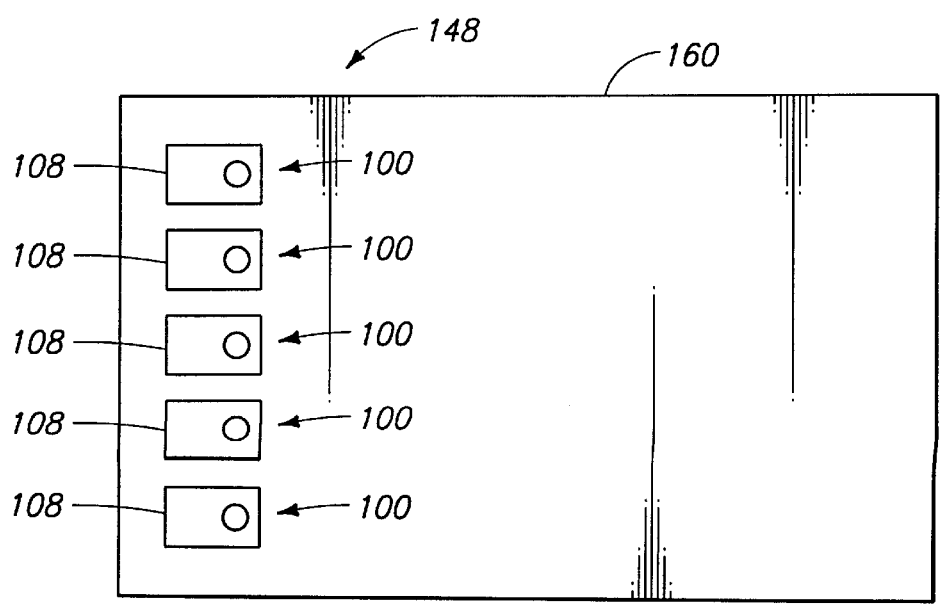

TAMPER RESISTANT SMART CARD AND METHOD OF PROTECTING DATA IN A SMART CARD

TECHNICAL FIELD

The invention relates to smart cards. More particularly, the invention relates to protecting data on smart cards from access or tampering by unauthorized individuals.

BACKGROUND OF THE INVENTION

Smart cards typically include an integrated circuit providing both memory and processing functions, have words or pictures printed on it, and control who uses information stored in the integrated circuit and how the information is used.

Some smart cards have length and width dimensions corresponding to those of credit cards. The size of such smart cards is determined by an international standard (ISO 7816). ISO 7816 also defines the physical characteristics of the plastic, including temperature tolerance and flexibility. ISO 7816 also defines the position of electrical contacts and their functions, and a protocol for communications between the integrated circuit and readers (vending machines, payphones, etc.). The term "smart card," as used herein, is meant to include cards that include microprocessors but that do not necessarily conform to ISO 7816.

Several types of plastic are used for the casings or housings of smart cards. PVC and ABS are typical. PVC can be embossed, but is not readily recyclable. ABS is not readily embossed, but is recyclable.

Smart cards have many different applications. For example, smart cards can be prepaid cards used instead of money for making purchases from vending machines, gaming machines, gas stations, car washes, photocopiers, laundry machines, cinemas, fast food restaurants, retail outlets, or anywhere where cash is used. For example, they are commonly used in Europe with public telephones. A timer is used to deduct a balance from the card automatically while a conversation continues. Smart cards can be used as food stamps, or for redeeming other government provided benefits. Because the transaction is electronic, the telephone, vending machine, etc. does not need to store cash, so risk of loss due to theft can be reduced. Change does not need to be stored and disbursed, and received payment can be directly wired to a bank. Prepaid cards can be a form of advertising, because they can have logos or other information printed on them. The user will typically carry the card for weeks before using up the value on the card.

To authenticate a conventional credit card, a telephone call must be made to verify that funds are available. Smart cards permit such verification to be performed off line, thus saving telecommunication charges. Smart cards thus provide an advantage over conventional credit cards. Smart cards can also be used as keys to gain access to restricted areas, such as secure areas of buildings, or to access parking lots.

Radio frequency identification devices can also be considered to be smart cards if they include an integrated circuit. Radio frequency identification devices are described in detail in U.S. patent application Ser. No. 08/705,043, filed Aug. 29, 1996, and incorporated herein by reference.

One specific application for smart cards is as an access key for communications systems. Smart cards are employed in a GSM (Global System for Mobile Communications) radio telephone system in Europe. A GSM subscriber is issued a smart card, and when that smart card is inserted into any GSM telephone, that telephone becomes the user's own personal phone after activation using a PIN (personal identification number). Calls to the user's phone number will reach the activated phone with the smart card. The smart card is an access key, and the PIN impedes use of stolen or lost credit cards. Smart cards are similarly used as access keys in satellite or cable television descramblers for receiving pay-tv channels or shows. Smart cards can be similarly used for renting computer programs.

Use of smart cards can be an effective way to combat payment fraud. Smart cards can also be used to store and transport medical data to increase convenience to the holder, and reduce errors and cost of handling information. Data can be accessed efficiently without compromising personal privacy.

One of the features of some smart cards is that they can hold data securely. Traditional smart cards store private information in persistent memory. The persistent memory is provided by nonvolatile forms of memory such as ROM, PROM, EPROM, or EEPROM. Access to information on such smart cards is controlled. For example, nobody can add units to a telephone card. On the other hand, a smart card holding medical records may allow everybody to access information such as blood type and patient's name, but access to other data may be restricted. Access control built into smart cards determines who can access the information on the card, and how the information on the card can be accessed (read, modified or augmented, erased). Some smart cards will only provide access if a correct password is given. If the information is of a type that the user will be able to access, the password will be one that the user must remember and use to access the information. Otherwise, the password may be hidden in a sales terminal, telephone, or card reader that accepts the smart card.

Different information in a smart card can be designated to be accessed in different ways. For example, some information may only be capable of being read, some information may be capable of only being added to or only subtracted from, some information may be capable of being modified or erased, and some information may never be accessed. Examples of information that typically can only be read include a unique serial number for each card, the number of units in the card when new, the name of the manufacturer of the card, etc. An example of information that only be subtracted from includes cash units or other indicia of value. Such information may also be tallied by adding spent units instead of subtracting from available units. Simple smart cards such as photocopy cards, are inexpensive to produce, but can be used by others if lost. More sophisticated smart cards have a password to restrict use to one person or machine that knows the password.

A smart card can be designed to restrict some or all of the information it stores (private information) for access only by an authorized person with a password. If the information will be transmitted over the telephone or by radio, additional protection is desirable. One form of protection is ciphering or encryption. Some smart cards hold private information in the form of cryptographic keys that are used in a variety of cryptographic protocols. These keys must be protected from direct disclosure. When the smart card is used in its intended application, the cryptographic protocols confirm that the card holds the key or keys, but do not disclose the key.

Many smart cards do not store private information in a readily readable form on the smart card. Instead, they use a PIN (personal identification number) to encrypt the private information. Thus, even if the private information is obtained by an unauthorized individual, it must still be deciphered. However, PIN encryption is a weak link in a cryptographic scheme. PIN numbers must be easy to remember, so are typically short and have some significance to the owner. Because of this, PIN numbers are relatively to determine.

Various tamper detection mechanisms are in present use with respect to smart cards. However, there are problems with such tamper detection mechanisms and many card providers routinely disable the tamper detection mechanisms.

Traditional smart cards obtain power from the reader with which they are used. This makes information in the smart cards subject to attacks based on bad power.

SUMMARY OF THE INVENTION

The invention provides a smart card which includes a power supply and a random access memory in a common housing. If an unauthorized individual attempts to gain access to data in the random access memory, the power supply will be interrupted, and the data will be lost.

In one aspect of the invention, private data is encrypted with a personal identification number, and is then stored in the random access memory. Thus, even if the data is somehow obtained without interrupting the power supply, it will still be encrypted.

One aspect of the invention provides a method of protecting data in a smart card from unauthorized access. A housing defined by first and second housing portions is provided, and a volatile memory is employed in the smart card for storing the data. The volatile memory is supported from the first housing portion. A power supply is provided in the housing, and the power supply maintains the data in the volatile memory while the power supply is connected to the volatile memory. In one aspect of the invention, the power supply is connected to the volatile memory using a conductor supported by and movable with the second housing portion.

One aspect of the invention provides a tamper resistant smart card comprising a housing including first and second portions; a memory; and means for erasing the memory if the first portion is separated from the second portion.

BRIEF DESCRIPTION OF THE DRAWINGS

Preferred embodiments of the invention are described below with reference to the following accompanying drawings.

FIG. 1 is a front elevational view of a smart card embodying the invention.

FIG. 2 is an assembly view illustrating a method of manufacturing the smart card of FIG. 1.

FIG. 6 shows a radio frequency communication system including an alternative smart card embodying the invention.

FIGS. 7 and 8 show front and rear elevational views of the alternative smart card at an intermediate processing step.

FIG. 11 is a rear elevational view of the smart card of FIG. 8 at a processing step subsequent to that shown in FIG. 8.

FIG. 12 is a top plan view of a panel of material used to manufacture a plurality of the smart cards of FIG. 8.

DETAILED DESCRIPTION OF THE PREFERRED EMBODIMENTS

Figure 3:
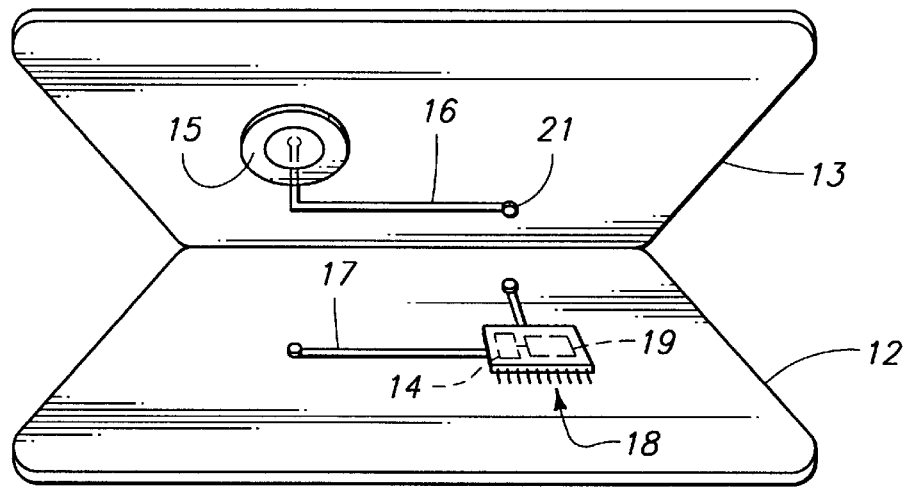
FIG. 3 is an assembly view illustrating an alternative method of manufacturing the smart card of FIG. 1.

This disclosure of the invention is submitted in furtherance of the constitutional purposes of the U.S. Patent Laws "to promote the progress of science and useful arts" (Article 1, Section 8).

A smart card 10 embodying the invention is shown in FIG. 1. A method of manufacturing the smart card 10 so as to protect data in the smart card is illustrated in FIG. 2. The smart card 10 includes a housing 11 (FIG. 1) defined by first and second housing portions 12 and 13. In one embodiment, the housing 11 has a width W of about 3.375 inches and a height H of about 2.125 inches. In one embodiment, the housing 11 has a thickness less than or equal to about 0.0625 inches. In the illustrated embodiment, the housing 11 has a thickness of about 0.0625 inches. However, by using thinner batteries such as described in battery patents listed below, the thickness of the housing can be reduced. In one embodiment, the housing 11 has width and height dimensions corresponding to standard dimensions for credit cards. More particularly, in one embodiment, the housing 11 has a width and a height in accordance with ISO 7816. The housing portions 12 and 13 are held together using any appropriate means, such as by using glue, epoxy, thermal or ultrasonic welding, small screws, etc.

The smart card 10 includes a volatile memory 14 for storing data in the smart card. In the preferred embodiment, the volatile memory 14 comprises a random access memory. More particularly, the volatile memory 14 comprises a static random access memory. In the illustrated embodiment, the smart card 10 includes an integrated circuit 18 including the memory 14, and further including a microprocessor 19 performing functions typical of a smart card memory 14. In one embodiment, the integrated circuit 18 is the integrated circuit described in U.S. patent application Ser. No. 08/705,043, which names James O'Toole, John R. Tuttle, Mark E. Tuttle, Tyler Lowrey, Kevin Devereaux, George Pax, Brian Higgins, Shu-Sun Yu, David Ovard and Robert Rotzoll as inventors, which was filed on Aug. 29, 1996, which is assigned to the assignee of this patent application, and which is incorporated herein by reference. The microprocessor 19 stores data in the memory 14. In one embodiment, the microprocessor 19 encrypts data using a password and stores the encrypted data in the memory 14. In the illustrated embodiment, the integrated circuit 18, and thus the volatile memory 14 is supported by the first housing portion 12.

The smart card 10 further includes a power supply 15 in the housing 11. The power supply 15 has first and second terminals of opposite polarity. The power supply maintains the data in the volatile memory 14 while the power supply is connected to the volatile memory 14. More particularly, the power supply maintains the data in the volatile memory 14 while the power supply is connected to the integrated circuit 18. In the illustrated embodiment, the power supply 15 comprises a battery, preferably a thin profile battery. Thin profile batteries are described in U.S. Pat. No. 5,547,781 issued Aug. 20, 1996; U.S. Pat. No. 5,432,027 issued Jul. 11, 1995; U.S. Pat. No. 5,486,431 issued Jan. 23, 1996; U.S. Pat. No. 5,480,462 issued Jan. 2, 1996; U.S. Pat. No. 5,494,495 issued Feb. 27, 1996; U.S. Pat. No. 5,536,596 issued Jul. 16, 1996; U.S. Pat. No. 5,580,674 issued Dec. 3, 1996; U.S. Pat. No. 5,542,959 issued Aug. 6, 1996; and U.S. Pat. No. 5,584,891 issued Dec. 17, 1996, all of which are assigned to the assignee of this patent application and all of which are incorporated herein by reference. In one embodiment, the battery 15 is mounted to the housing portion 12 and connected to the conductor 17 using conductive epoxy.

In the illustrated embodiment, the smart card 10 further includes a conductor 16 connecting one of the terminals of the power supply 15 to a first power supply pin of the integrated circuit 18, and another conductor 17 connecting the other terminal of the power supply to the integrated circuit 18. In the illustrated embodiment, the conductor 16 is supported by and movable with the second housing portion 13. The smart card 10 includes a contact 20, connected to the conductor 16, which connects the conductor 16 to the one terminal of the power supply 15 when the housing is assembled. The smart card 10 includes a contact 21, connected to the conductor 16, which connects the conductor 16 to a second power supply pin of the integrated circuit 18 when the housing is assembled. In one embodiment, the conductor 16 is printed onto the second housing portion 13 (e.g., screen printed or stencil printed).

If the first housing portion is separated from the second housing portion, power to the integrated circuit 18 is interrupted, and data in the volatile memory is lost. Thus, the data is restricted from being retrieved by an unauthorized individual by tampering with the housing 11.

In the embodiment shown in FIG. 2, both the power supply and the integrated circuit 18 (including the volatile memory 14) are mounted to a common housing portion 12. In an alternative embodiment, shown in FIG. 3 (like reference numerals indicating like components), the integrated circuit 18 (including the volatile memory 14) is mounted to one housing portion 12, and the battery 15 is mounted to the other housing portion 13.

Figure 4:
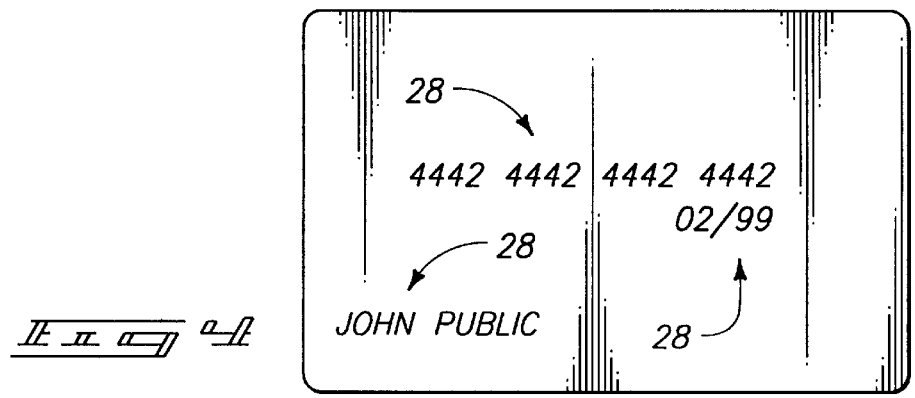
FIG. 4 is a front plan view of the smart card of FIG. 1 after additional processing.
Figure 5:
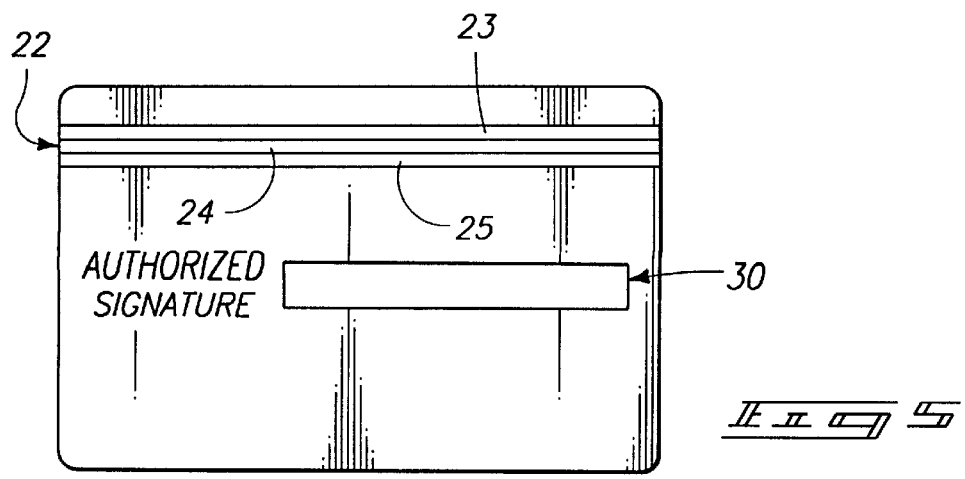
FIG. 5 is a rear plan view of the smart card of FIG. 1 after additional processing.

FIGS. 4 and 5 illustrate the smart card 10 after further processing steps. The smart card 10 further includes (FIG. 5) a magnetic stripe 22 on the outside of the housing 11. The magnetic stripe 22 includes two read-only magnetic tracks 23 and 24, and one read-write magnetic track 25, positioned in accordance with ISO 3554, ISO 3885/30, and ISO 3885/40. In the embodiment shown in FIGS. 4 and 5, the smart card 10 is embossed (see FIG. 4) with information such as an account number, expiration date, card holder name, valid from date (or member since date), etc. as illustrated generally by reference numerals 28. In one embodiment, the smart card 10 is embossed in accordance with ISO 3885. In one embodiment, the smart card 10 further includes a signature strip 30 (e.g., including a security background to aid in detecting alteration). Further, in the embodiment shown in FIGS. 4 and 5, the smart card 10 has information printed thereon such as bank name, bank logo, credit card type name, (e.g., VISASM), credit card type logo, bank phone number, networks with which the card can be used, etc. and includes a hologram (e.g., credit card type logo).

In one embodiment, the smart card 10 further includes electrical contacts (not shown) in accordance with ISO 7816, and the integrated circuit 18 communicates with readers (vending machines, payphones, etc.) using the communications protocol specified in ISO 7816.

In the embodiments shown in FIGS. 4 and 5, the housing 11 is made of PVC plastic or of ABS plastic. More particularly, the housing 11 is made of a plastic having physical characteristics, including temperature tolerance and flexibility, conforming to ISO 7816.

The smart card 10 controls access to the data in the memory 14 depending on the application in which the smart card 10 is employed. For example, if the smart card 10 is used as a telephone card, it can be configured such that nobody can add time units to memory 14 of the telephone card and is disposable after all time unit credits have expired. On the other hand, if the smart card 10 is used to hold medical records, it can be configured such that anyone is allowed to access certain information, such as blood type and the patient's name. Access to other data may be restricted. The smart card 10 includes access control which determines who can access the information on the card, and how the information on the card can be accessed (read, modified or augmented, erased). In one embodiment, the smart card 10 will only provide access if a correct password or PIN (personal identification number) is given. If the information is of a type that the user will be able to access, the password will be one that the user must remember and use to access the information. Otherwise, the password may be hidden in a sales terminal, telephone, or card reader that accepts the smart card 10.

Different information stored in the memory 14 in the smart card 10 can be designated to be accessed in different ways. For example, some information may only be capable of being read, some information may be capable of only being added to or only subtracted from, some information may be capable of being modified or erased, and some information may never be accessed. Examples of information that typically can only be read include a unique serial number for each card, the number of units in the card when new, the name of the manufacturer of the card, etc. An example of information that only be subtracted from includes cash units or other indicia of value. Such information may also be tallied by adding cash units. In some embodiments, the smart cards 10 have a password to restrict use to one person or machine that knows the password. In one embodiment, the smart cards 10 hold private information in the form of cryptographic keys that are used in a cryptographic protocol. When the smart card 10 is used in its intended application, the cryptographic protocols confirm that the card holds the key or keys, but do not disclose the key. In one embodiment, a PIN is used to encrypt private information stored on the smart card 10. Thus, even if the private information is obtained by an unauthorized individual, it must still be deciphered.

Because the smart card 10 includes its own power source, and is not dependent on a reader for power, a volatile memory can be employed, and private data can be protected against access by an unauthorized individual.

Further, in embodiments where a battery is employed as a power source, data in the smart card 10 is protected against a power repetition type attacks (repetitive attacks). Because the smart card 10 includes a battery and includes a volatile memory, it protects data in the smart card 10 against repetitive attacks, such as where an unauthorized individual tries various combinations (or sequences through various possibilities) hoping to determine an encryption key, PIN, or other information. More particularly, such repetitive attacks will result in the battery becoming drained, causing data in the volatile memory to be lost or erased.

An alternative smart card 100 is shown in FIG. 6. A method of manufacturing the smart card 100 of FIG. 6 is shown in FIGS. 7–12. FIG. 7 shows the front of the smart card 100 and FIG. 8 shows the back of the smart card 100.

In the illustrated embodiment, the smart card 100 comprises part of a radio frequency communication system 102.

The communication system 102 shown in FIG. 6 further includes an interrogator unit 104. In the embodiment illustrated in FIG. 6, the smart card 100 receives and transmits radio frequency (RF) signals from and to the interrogator unit 104. The system 102 further includes an antenna 106 coupled to the interrogator unit 104. An exemplary radio frequency communication system is described in U.S. patent application Ser. No. 08/705,043, which was incorporated above.

In alternative embodiments, the smart card 100 does not communicate with an interrogator unit using radio frequency communications but instead communicates with a reader in the same manner as conventional smart cards.

The smart card 100 includes a substrate or layer of supportive material 108. The term "substrate" as used herein refers to any supporting or supportive structure, including, but not limited to, a supportive single layer of material or multiple layer constructions. In the illustrated embodiment, the substrate 108 comprises a polyester film having a thickness of 4–6 mils. More particularly, in the illustrated embodiment, the substrate 108 comprises a polyester film having a thickness of 5 mils (five thousandths of an inch). Other materials are possible. Typically, the polyester film is provided in a roll, using which a number of similar or identical devices, such as the smart card 100, are fabricated at the same time and in an assembly line manner. Accordingly, a roll of polyester film is provided to support a plurality of devices which are contemporaneously formed thereon. An exemplary roll is 24 inches wide. In the illustrated embodiment, the polyester film is transparent. The substrate 108 defines a first housing portion for each of the smart cards 100.

In one embodiment, various layers of ink are printed on an inner side of the polyester film facing (after assembly) the back of the smart cards. In the illustrated example, supported inks can be used to convey information such as logos and/or company names such as those illustrated at 112 which are respectively, the name of a product incorporating the inventive subject matter described below and the assignee of this patent application. The logo can be viewed through the transparent film, and is protected (e.g., against scratching) by the thickness of the polyester film. When viewed through the film, the logo has an enhanced appearance.

Following the application, if any, of logos or company names 112, a plurality of layers of ink are provided or formed over substrate 108 directly atop any such logos or company names. Preferably, such layers are provided to a degree to effect a complete opacity such that conductive inks and circuitry components (described below) are not viewable through the front of the card. Exemplary ink layers are broken or peeled away at 122, 124, 126, and 128 in FIG. 8. In one implementation, the layers 122, 124, and 126 comprise layers of white ink and the layer 128 comprises a layer of dark gray ink, the latter providing a desired level of contrast relative to conductive ink which is to be applied to the substrate and described just below. Such contrast is desirable from the standpoint of being able to visually inspect the conductive ink for pin hole defects during manufacturing. The layer 128 defines a portion of an intermediate outer surface 131.

After provision of the layers 122 through 128, conductive ink 130 is formed or applied over the substrate 108 directly atop the layer 128 and the surface 131. A preferred conductive ink comprises silver ink. One manner of forming or applying the conductive ink on the substrate is to screen print the ink on the substrate through conventional screen printing techniques. The conductive ink forms desired electrical connections with and between electronic components which will be described below. In one embodiment, where the smart card is capable of radio frequency communications, the conductive ink further provides an antenna 132 which is suitable for receiving and transmitting electronic signals or RF energy. The illustrated antenna constitutes a loop antenna. The substrate 108 includes an outer periphery 110 inside of which a portion, and preferably the entire antenna extends or lies. Other antenna constructions are possible. In instances where substrate 108 forms a portion of a larger roll of polyester film material, the printing of conductive ink 130 can take place simultaneously for a number of the to-be-formed smart cards.

Figure 9:
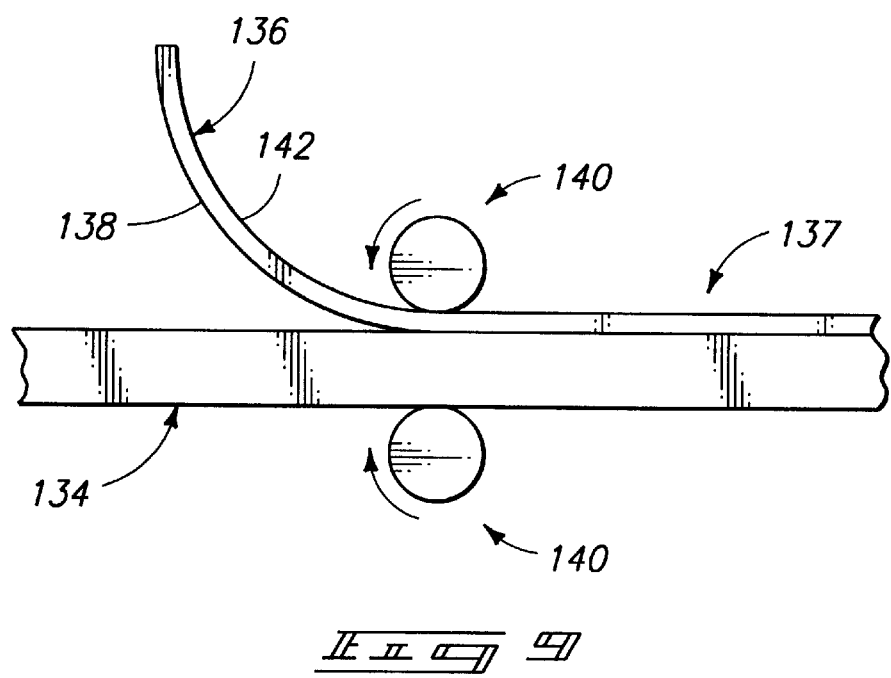
FIG. 9 shows an intermediate processing step of manufacturing the smart card of FIG. 6.

Referring to FIG. 9, a rigid carrier panel 134 is provided. The carrier panel 134 serves as a temporary support for the substrate 108 during downstream processing. A roll of double-sided tape 136 is also provided and processed together with carrier panel 134 to form an adhesive body 137 upon which the substrate 108 will be mounted. In the illustrated example, the carrier panel 134 has substantially the same dimensions as the roll of polyester material. The tape 136 has a high tack side 138 which is laminated via rollers 140 onto carrier panel 134. The tape 136 also has a low tack side 142 which faces upwardly after the tape has been laminated onto the carrier panel. Suitable release liners (not shown) are provided relative to each tape side and can be removed prior to affixation of the tape on or relative to a surface. A suitable material from which carrier panel 134 is formed is fiberglass board. Other materials are possible. The carrier panel 134 has a thickness sufficient that it will not bow under its own weight. For example, for fiberglass board, the carrier has a thickness of at least 3 millimeters. In a preferred embodiment, the carrier panel 134 has a thickness of 5 millimeters.

Figure 10:
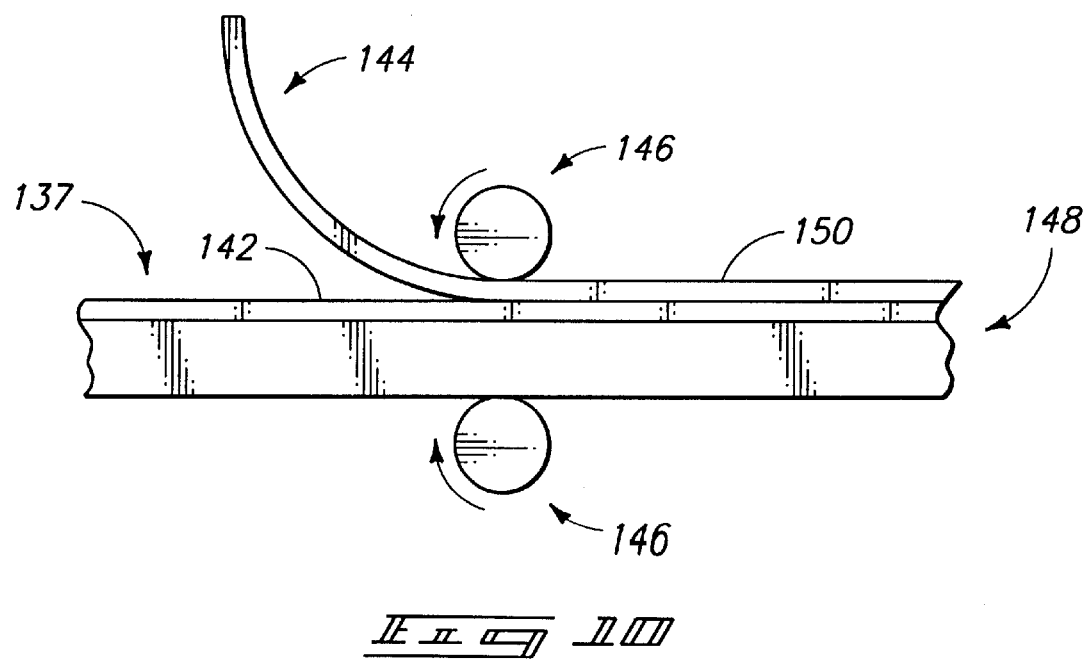
FIG. 10 shows an intermediate processing step which is downstream from the processing step of FIG. 9.

Referring to FIG. 10, the adhesive body 137 is shown at a subsequent processing step. An exemplary roll of the polyester film material is shown generally at 144. The polyester film material roll 144 has been previously processed and imprinted with conductive ink 130 (FIG. 8) as described above. Accordingly, the roll 144 comprises a plurality of substrates, such as the substrate 108 (FIG. 7), which are to be processed to form individual devices. The plurality of substrates 108 can be arranged either lengthwise or widthwise, or the roll 144 can have substrates arranged both lengthwise and widthwise. The roll 144 is laminated onto the low tack side 142 (after the removal of the release liner thereon) of the adhesive body 137 by passage through rollers 146. Such provides a sheet or panel 148 of supportive material having a circuit side 150 which defines the surface 131 (FIG. 8) for a plurality of smart cards and over which layers of ink have been applied.

The sheet or panel 148 is next placed in a stencil printer. Conductive epoxy is applied over desired areas of the surface 131 (FIG. 8) using the stencil printer to assist in component attachment described just below. In one embodiment, solder is employed instead of conductive epoxy.

Referring to FIG. 11, a power source 152 is provided and mounted on each substrate 108 using the conductive epoxy. In the illustrated embodiment, the power source 152 is a battery. The battery 152 is preferably a thin profile battery which includes first and second terminals. More particularly, the battery 152 has a lid or negative terminal, and a can or positive terminal. Thin profile batteries are described in the U.S. patents listed and incorporated above.

An integrated circuit 154 is provided and mounted on each of the substrates 108 using the conductive epoxy. The integrated circuits 154 can be mounted either before or after the batteries are mounted on the substrates 108. The integrated circuits 154 include suitable circuitry for a smart card, including, for example, a microprocessor 162 and a memory 164. The memory 164 is a volatile memory. More particularly, in the illustrated embodiment, the memory 164 is a random access memory. Still more particularly, in the illustrated embodiment, the memory 164 is a static random access memory. The memory 164 receives power when the integrated circuit 154 receives power. In one embodiment, the integrated circuit 154 further includes transponder circuitry for radio frequency communications with an interrogator unit 104. An exemplary and preferred integrated circuitry package is described in U.S. patent application Ser. 08/705,043 incorporated by reference above.

The smart card 100 includes a first battery connection terminal 153 and a second battery connection terminal 158. The first battery connection terminal 153 is coupled to the integrated circuit by the conductive epoxy, and the second battery connection terminal 153 is coupled to the integrated circuit by the conductive epoxy. The conductive epoxy also electrically connects the first terminal of the battery to the first battery connection terminal 153. In the illustrated embodiment, the battery 152 is placed lid down such that the conductive epoxy makes electrical contact between the negative terminal of the battery and the first battery connection terminal 153.

The battery 152 has a perimetral edge 156, defining the second battery terminal, which is disposed adjacent the second battery connection terminal 158. In the illustrated embodiment, the edge 156 of the battery 152 is cylindrical, and the battery connection terminal 158 is arcuate and has a radius slightly greater than the radius of the battery, so that the battery connection terminal 158 is closely spaced apart from the edge 156 of the battery. Subsequently, conductive epoxy is dispensed relative to battery perimetral edge 156 and electrically connects the perimetral edge 156 with battery connection terminal 158. In the illustrated embodiment, the perimetral edge 156 defines the can of the battery, such that the conductive epoxy connects the positive terminal of the battery to the battery connection terminal 158.

The conductive epoxy is then cured.

Referring to FIG. 12, the sheet or panel 148 (which supports a plurality of substrates 18), undergoes further processing in which an amount of adhesive material 160 is applied around a perimeter edge of the sheet or panel. In the illustrated example, the sheet or panel 148 defines an 18×24 inch perimeter around which the adhesive material is applied. Such applied adhesive material forms a dam relative to and inside of which encapsulating epoxy material is to be formed. Subsequently, encapsulating epoxy material is formed over the sheet 148 to encapsulate each of the substrates 108 to cover the integrated circuits and batteries, and conductive traces and to define a second housing portion for each of the smart cards 100. In the illustrated embodiment, such epoxy constitutes a two-part epoxy having a resin and a hardener which are sufficient to provide a desired degree of flexible rigidity. After application and curing of such epoxy, the sheet or panel 148 is subjected to suitable separation or singulation processing in which individual smart cards 100 are cut and separated from one another. An exemplary separation process employs water jet cutting which suitably separates individual devices. Other methods of separating the smart cards 100 from each other can be employed. For example, the smart cards 100 can be separated by mechanical cutting.

If an attempt is made to separate the epoxy from the substrate 108, the supply of power to the integrated circuit will be interrupted (e.g., the battery and/or the integrated circuit will be pulled away from the substrate 108) and data stored in the volatile memory will be lost.

Further, in embodiments where a battery is employed as a power source, data in the smart card 100 is protected against repetition type attacks (repetitive attacks). Because the smart card 100 includes a battery and includes a volatile memory, it protects data in the smart card 100 against repetitive attacks, such as where an unauthorized individual tries various combinations (or sequences through various possibilities) hoping to determine an encryption key, PIN, or other information. More particularly, such repetitive attacks will result in the battery becoming drained, causing data in the volatile memory to be lost or erased.

Thus, a smart card has been disclosed which protects data from unauthorized access. Attempts to open the housing to connect probes to the integrated circuit result in power being interrupted, and data being erased. The smart cards 10 or 100 have many different applications. For example, the smart cards 10 or 100 can be used as prepaid cards used instead of money for making purchases from vending machines, pay telephones, gaming machines, gas stations, car washes, photocopiers, laundry machines, cinemas, fast food restaurants, retail outlets, or anywhere where cash is used. The smart cards 10 or 100 can be used as food stamps, or for redeeming other government provided benefits. The smart cards 10 or 100 can be used as access keys for communications systems, such as in a GSM (Global System for Mobile Communications) system. The smart cards 10 or 100 can be used as access keys in satellite or cable television descramblers for receiving pay-tv channels or shows, or for renting computer programs. The smart cards 10 or 100 can be used to store and transport medical data. The smart cards 10 or 100 can be used for access control. The smart cards 10 or 100 can be used as radio frequency identification devices. The smart cards 10 or 100 can be used as credit or debit cards. The smart cards 10 or 100 can be used for any application where smart cards are presently being used.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of protecting data stored in a smart card, the method comprising:

provoding a housing including first and second portions;

providing a volatile memory in the housing;

providing a battery in the housing; and connecting the battery to the memory, using a conductor including conductive epoxy, such that power to the memory is interrupted and data in the memory is erased if the first portion of the housing is moved relative to the second portion of the housing.

2. A method in accordance with claim 1 wherein the step of providing a housing comprises providing a polymeric film to define the first housing portion, providing a flowable material on the first housing portion to define the second housing portion, and causing the flowable material to harden.

3. A method in accordance with claim 1 wherein the step of employing a volatile memory and the step of providing a battery comprises mounting the volatile memory and the battery to the first housing portion and coupling the battery to the volatile memory using a conductor fixed to the first housing portion.

4. A method in accordance with claim 1 wherein the step of providing a battery comprises mounting the battery to the second housing portion.

5. A method in accordance with claim 1 and further comprising the step of providing a magnetic stripe on the outside of the housing.

6. A method of protecting data in a smart card from unauthorized access, the method comprising:

provide a housing defined by first and second housing portions;

employing a volatile memory in the smart card for storing the data, and supporting the volatile memory from the first housing portion;

providing a power supply in the housing, the power supply maintaining the data in the volatile memory while the power supply is connected to the volatile memory; and connecting the power supply to the volatile memory using a conductor of conductive epoxy supported by and movable with the second housing portion.

7. A method in accordance with claim 6 wherein the step of employing a volatile memory comprises the step of providing a random access memory.

8. A method in accordance with claim 6 wherein the step of employing a volatile memory and the step of providing a power supply comprises mounting the volatile memory and the power supply to the first housing portion.

9. A method in accordance with claim 6 wherein the step of providing a power supply comprises mounting the power supply to the second housing portion.

10. A method in accordance with claim 6 wherein the step of employing a volatile memory comprises the step of providing a static random access memory.

11. A method in accordance with claim 6 wherein the step of employing a volatile memory comprises providing an integrated circuit including a microprocessor and a static random access memory, and wherein the connecting step comprises connecting the power supply to the integrated circuit.

12. A method in accordance with claim 6 wherein the step of employing a power supply comprises the step of providing a thin profile battery.

13. A method in accordance with claim 6 wherein the step of providing a housing comprises providing a housing having a width of about 3.375 inches and a height of about 2.125 inches.

14. A method in accordance with claim 6 wherein the step of providing a housing comprises providing a housing having a width of about 3.375 inches, a height of about 2.125 inches, and a thickness less than or equal to about 0.0625 inches.

15. A method in accordance with claim 6 wherein the connecting step comprises printing a conductor on the second housing portion.

16. A method in accordance with claim 6 and further comprising the step of providing a magnetic stripe on the outside of the housing, the magnetic stripe including two read-only magnetic tracks, and one read-write magnetic track, positioned in accordance with ISO 3554, ISO 3885/30, and ISO 3885/40.

17. A method in accordance with claim 6 and further comprising the step of embossing the housing.

18. A method of protecting data in a smart card from unauthorized access, the method comprising:

providing first and second housing portions having respective conductors fixed thereto, the conductor fixed to the second housing portion being formed of conductive epoxy;

providing a volatile memory for storing the data, and fixing the volatile memory to the first housing portion;

providing a battery having first and second terminals, the battery maintaining the data in the volatile memory while the power supply is connected to the volatile memory, fixing the battery to the first housing portion with the conductor on the first housing portion connecting the first terminal of the battery to the volatile memory; and joining the second housing portion with the first housing portion to define a housing having the conductor fixed to the second housing portion connecting the second terminal of the battery to the volatile memory with the battery maintaining the data in the volatile memory only while the first housing portion remains attached to the second housing portion.

19. A method in accordance with claim 18 wherein the step of providing a volatile memory comprises the step of providing a random access memory.

20. A method in accordance with claim 18 wherein the step of providing a volatile memory comprises the step of providing a static random access memory.

21. A method in accordance with claim 18 wherein the step of providing a volatile memory comprises providing an integrated circuit including a microprocessor and a static random access memory.

22. A method in accordance with claim 18 wherein the step of providing a battery comprises the step of providing a thin profile battery having a thickness less than 1.6 millimeters.

23. A method in accordance with claim 18 wherein the step of attaching the second housing portion to the first housing portion results in the housing having a thickness less than or equal to 0.0625 inches.

24. A method in accordance with claim 18 wherein the step of attaching the second housing portion to the first housing portion results in the housing having a width and a height in accordance with ISO 7816.

25. A method of protecting data in a smart card from unauthorized access, the method comprising:

providing first and second housing portions having respective conductors fixed thereto;

providing a volatile memory for storing the data, and fixing the volatile memory to the first housing portion;

providing a battery having first and second terminals, the battery maintaining the data in the volatile memory while the power supply is connected to the volatile memory, fixing the battery to the first housing portion with the conductor on the first housing portion connecting the first terminal of the battery to the volatile memory; and providing the second housing portion joined with the first housing portion to define a housing having the conductor fixed to the second housing portion connecting the second terminal of the battery to the volatile memory with the battery maintaining the data in the volatile memory only while the first housing portion remains attached to the second housing portion, wherein providing first and second housing portions having respective conductors fixed thereto comprises providing a sheet of translucent polyester film having interior and exterior sides, painting ink on the interior side of the polyester film, the ink being visible from outside the card, and printing a conductor on the ink to define the first housing portion.

26. A method in accordance with claim 25 wherein the step of providing first and second housing portions having respective conductors thereon comprises forming conductive epoxy on at least one of the first and second housing portions.

27. A method in accordance with claim 25 wherein the step of providing first and second housing portions having respective conductors thereon comprises forming a conductor of clear epoxy on at least one of the first and second housing portions.

28. A method in accordance with claim 25 and further comprising the step of providing a magnetic stripe on the outside of the housing.

29. A method in accordance with claim 25 and further comprising the step of providing a magnetic stripe on the outside of the housing, the magnetic stripe including two read-only magnetic tracks, and one read-write magnetic track.

30. A method in accordance with claim 25 and further comprising the step of providing a magnetic stripe on the outside of the housing, the magnetic stripe including two read-only magnetic tracks, and one read-write magnetic track, positioned in accordance with ISO 3554, ISO 3885/30, and ISO 3885/40.

31. A method in accordance with claim 25 and further comprising the step of embossing the housing.

32. A method in accordance with claim 25 and further comprising the step of embossing the housing in accordance with ISO 3885.

33. A method of protecting data stored in a smart card against repetitive attacks, the method comprising:

providing a housing including first and second portions;

providing a volatile memory in the housing;

providing a battery in the housing;

connecting the battery to the memory, using a conductor including conductive epoxy, such that power to the memory is lost and data in the memory is erased if the first portion of the housing is moved relative to the second portion of the housing; and storing medical data in the volatile memory.

34. A method of protecting data in accordance with claim 33 wherein providing a housing comprises providing a polymeric film to define the first housing portion, providing a flowable material on the first housing portion to define the second housing portion, and causing the flowable material to harden.

35. A smart card comprising:

a housing including two opposing major portions that are connected together;

an integrated circuit supported in the housing, the integrated circuit including a microprocessor and a random access memory, the random access memory being used to store data;

a battery supported in the housing and having first and second terminals, the first terminal being coupled to the integrated circuit; and a conductor coupling the second terminal of the battery to the integrated circuit to complete a circuit, the conductor including conductive epoxy and being supported by the housing such that separation of one of the portions of the housing from the other portion opens the circuit and breaks connection of the battery to the integrated circuit so that data held in the random access memory is erased.

36. A smart card in accordance with claim 35 wherein one of the housing portions comprises a polymeric film.

37. A smart card in accordance with claim 35 and further comprising a magnetic stripe on the outside of the housing.

* * * * *

UNITED STATES PATENT AND TRADEMARK OFFICE
CERTIFICATE OF CORRECTION

PATENT NO. : 5,988,510

DATED : November 23, 1999

INVENTOR(S) :
John R. Tuttle et al.

It is certified that error appears in the above-identified patent and that said Letters Patent is hereby corrected as shown below:

Column 3, line 5, insert --easy-- after "relatively".

Column 5, line 55, replace "VISASM" with --VISA$^{SM}$--.

Signed and Sealed this

Nineteenth Day of September, 2000

Attest:

Q. TODD DICKINSON

Attesting Officer     Director of Patents and Trademarks